United States Patent [19]
Blok et al.

[11] Patent Number: 5,736,611
[45] Date of Patent: Apr. 7, 1998

[54] SULFUR-VULCANIZED RUBBER COMPOUND HAVING IMPROVED REVERSION RESISTANCE

[75] Inventors: Edward John Blok, Wadsworth; Paul Harry Sandstrom, Tallmadge; Edward Roy Terrill, Akron; David John Zanzig, Uniontown; Jennifer Ann McDougal, Cuyahoga Falls, all of Ohio

[73] Assignee: The Goodyear Tire & Rubber Company, Akron, Ohio

[21] Appl. No.: 798,838

[22] Filed: Feb. 12, 1997

[51] Int. Cl.$^6$ .............................. C08K 3/30; C08K 5/11
[52] U.S. Cl. .................. 525/305; 525/193; 525/332.5; 525/332.6
[58] Field of Search ................... 525/305, 332.5, 525/332.6, 193

[56] References Cited

U.S. PATENT DOCUMENTS

| | | | |
|---|---|---|---|
| 4,014,852 | 3/1977 | Gessler et al. | 260/42.35 |
| 4,226,953 | 10/1980 | Coran et al. | 525/193 |
| 4,633,912 | 1/1987 | Pilkington et al. | 138/132 |
| 4,857,571 | 8/1989 | Reiter et al. | 524/248 |
| 5,490,878 | 2/1996 | Peterson et al. | 51/295 |

FOREIGN PATENT DOCUMENTS 254071  10/1969  U.S.S.R. .

*Primary Examiner*—Irina S. Zemel
*Attorney, Agent, or Firm*—Bruce J. Hendricks

[57] ABSTRACT

This invention relates to the discovery that the addition of a free triacrylate, tetraacrylate and/or pentaacrylate compound(s) to an uncrosslinked rubber which is then sulfur-vulcanized results in desirable reversion resistant rubber compound properties.

12 Claims, No Drawings

5,736,611

SULFUR-VULCANIZED RUBBER COMPOUND HAVING IMPROVED REVERSION RESISTANCE

BACKGROUND OF THE INVENTION

U.S. Pat. Nos. 3,756,607 and 5,268,134 disclose the combination of a peroxide curative and an acrylate crosslinker to cure a rubber compound.

U.S. Pat. No. 5,124,408 relates to rubber mixtures containing sulfur-modified polychloroprene gel. The rubber mixtures are prepared by combining a precrosslinked polychloroprene with a second rubber. The crosslinked polychloroprenes may be produced by copolymerization of crosslinking multifunctional compounds having a crosslinking effect. Amongst the scores of preferred crosslinking multifunctional comonomers include trimethyol ethane triacrylate and trimethacylate, trimethyol propane triacrylate and trimethacylate, tetramethyol methane tetraacrylate and tetramethacrylate. The rubber mixture is then sulfur-vulcanized. Unfortunately, precrosslinked rubber is difficult to disperse with other rubbers. In addition, conventional fillers such as silica and carbon black are difficult to disperse in the precrosslinked rubber.

Many components in a rubber article, such as a tire, are cured with a sulfur cure system. In general, these cure systems suffer from some degree of reversion. Reversion is a breakdown of the rubber network (crosslinks and polymer) which reduces the crosslink density and adversely affects the properties of a compound. With higher cure temperatures being employed to improve productivity, reversion has become an even bigger concern.

SUMMARY OF THE INVENTION

The present invention relates to rubber compounds and products made therefrom, which have improved reversion resistance. The present invention involves intimately dispersing various free triacrylate, tetraacrylate and/or pentaacrylate compounds in an uncrosslinked rubber compound that does not contain any peroxide curatives.

DETAILED DESCRIPTION OF THE INVENTION

There is disclosed a sulfur-vulcanizable rubber compound comprising (a) 100 parts by weight of an uncrosslinked rubber selected from the group consisting of natural rubber, synthetic cis-1,4-polyisoprene, polybutadiene, copolymers of isoprene and butadiene, copolymers of acrylonitrile and butadiene, copolymers of acrylonitrile and isoprene, terpolymers of styrene, butadiene and isoprene, copolymers of styrene and butadiene and blends thereof; and (b) from 0.25 to 10 phr of a free acrylate compound which is intimately dispersed throughout said rubber and said acrylate being selected from the group consisting of trimethyl propane triacrylate, trimethyl propane trimethacrylate, glycerol triacrylate, glycerol trimethacrylate, trimethyl ethane triacrylate, trimethyl ethane trimethacrylate, pentaerythritol tetraacrylate, pentaerythritol tetramethacrylate, dipentaerythritol pentaacrylate and mixtures thereof;

(c) from 0.5 to 6 phr of a sulfur-vulcanizing agent selected from the group consisting of elemental sulfur, an amine disulfide, polymeric polysulfide, sulfur olefin adducts and mixtures thereof;

wherein said rubber compound does not contain any peroxide curative.

In addition, there is disclosed a sulfur-vulcanized rubber compound having improved reversion resistance comprising the above-described sulfur-vulcanizable compound after such compound has been heated to a curing temperature ranging from about 125° C. to 180° C.

The uncrosslinked rubbers which may be used with the present invention are natural rubber, synthetic cis-1,4-polyisoprene, polybutadiene, copolymers of isoprene and butadiene, copolymers of acrylonitrile and butadiene, copolymers of acrylonitrile and isoprene, terpolymers of styrene, butadiene and isoprene, copolymers of styrene and butadiene and blends thereof. Of the above synthetic rubbers, such rubbers may be emulsion polymerized or solution polymerized. A major criteria of the rubbers for use in the present invention is that, when mixed with the free acrylate compound, the rubber must not be precrosslinked, such as those prepared by copolymerization of a diene monomer in the presence of an acrylate comonomer. The preferred rubbers are natural rubber, synthetic cis-1,4-polyisoprene, polybutadiene, copolymers of isoprene and butadiene, terpolymers of styrene, butadiene and isoprene, copolymers of styrene and butadiene and mixtures thereof.

According to the present invention, from 0.25 to 10 phr of a free acrylate compound is intimately dispersed throughout the rubber. What is intended by the term "free" acrylate is that, when added to the rubber compound, the acrylate compound is not chemically bound, copolymerized or grafted on to a rubber component and, therefore, is free to migrate to locations on the polymer (rubber) backbone where chain scission occurs during mixing and sulfur vulcanization. It is believed that the acrylates react with the free radicals formed during reversion and form new crosslinks and thus decrease reversion. Examples of such acrylates include trimethyl propane triacrylate, trimethyl propane trimethacrylate, glycerol triacrylate, glycerol trimethacrylate, trimethyl ethane triacrylate, trimethyl ethane trimethacrylate, pentaerythritol tetraacrylate, pentaerythritol tetramethacrylate, dipentaerythritol pentaacrylate and mixtures thereof. Preferably, the acrylate is present in an amount ranging from about 1 to 5 phr. The preferred acrylate is pentaerythritol tetraacrylate.

The acrylates are added to a sulfur-vulcanizable rubber. Therefore, one needs to have a sulfur-vulcanizing agent because the compound does not contain any peroxide curatives. Examples of suitable sulfur vulcanizing agents include elemental sulfur (free sulfur) or a sulfur donating vulcanizing agent, for example, an amine disulfide, polymeric polysulfide or sulfur olefin adducts or mixtures thereof. Preferably, the sulfur vulcanizing agent is elemental sulfur. The amount of sulfur vulcanizing agent will vary depending on the components of the rubber stock and the particular type of sulfur vulcanizing agent that is used. The sulfur vulcanizing agent is generally present in an amount ranging from about 0.5 to about 6 phr. Preferably, the sulfur vulcanizing agent is present in an amount ranging from about 0.75 phr to about 4.0 phr.

Conventional rubber additives may be incorporated in the rubber stock of the present invention. The presence of these conventional rubber additives is not considered to be an aspect of the present invention. The additives commonly used in rubber stocks include fillers, plasticizers, waxes, processing oils, peptizers, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representatives carbon blacks that are commonly used in rubber stocks include N110, N121, N220, N231, N234, N242, N293, N299, N330, N326, N330, N332, N339, N343, N347, N351, N358, N375, N472, N660, N754, N762, N765 and N990. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutylphthalate and tricresol phosphate. Common waxes which may be used include paraffinic waxes and microcrystalline blends. Such waxes are used in amounts ranging from about 0.5 to 5 phr. Typical amounts of processing oils comprise from about 1 to 70 phr. Such processing oils can include, for example, aromatic, naphthenic and/or paraffinic processing oils. Typical amounts of peptizers comprise about 0.1 to about 1 phr. Typical peptizers may be, for example, pentachlorothiophenol and dibenzamido-diphenyl disulfide. Materials used in compounding which function as an accelerator-activator includes metal oxides such as zinc oxide and magnesium oxide which are used in conjunction with acidic materials such as fatty acid, for example, stearic acid, oleic acid, murastic acid, and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

Accelerators are used to control the time and/or temperature required for vulcanization and to improve the properties of the vulcanizate. In one embodiment, a single accelerator system may be used; i.e., primary accelerator. The primary accelerator(s) may be used in total amounts ranging from about 0.5 to about 4, preferably about 0.8 to about 2.0, phr. In another embodiment, combinations of a primary and a secondary accelerator might be used with the secondary accelerator being used in a smaller, equal or greater amount to the primary accelerator. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a disulfide, guanidine, dithiocarbamate or thiuram compound.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

The terms "non-productive" and "productive" mix stages are well known to those having skill in the rubber mixing art.

Siliceous pigments may be used in the rubber compound applications of the present invention, including precipitated siliceous pigments (silica). The siliceous pigments employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

In-situ resins may be formed in the rubber stock and involve the reaction of cashew nut oil modified novolak-type phenolic resin or resorcinol and a methylene donor. These phenolic resins or resorcinol, if used, are generally present in an amount ranging from about 0.1 phr to 10.0 phr. Preferably, the amount of phenolic resin or resorcinol ranges from 2.0 phr to 5.0 phr.

The term "methylene donor" is intended to mean a compound capable of reacting with the cashew nut oil modified novolak-type phenolic resin or resorcinol and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

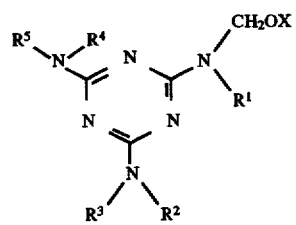

wherein X is an alkyl having from 1 to 8 carbon atoms, $R^1$ $R^2$, $R^3$, $R^4$ and $R^5$ are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)

melamine and N,N'N"-tributyl-N,N',N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282-286. Antidegradants are generally used in amounts from about 0.25 to about 5.0 phr with a range of from about 1.0 to about 3.0 phr being preferred.

The sulfur vulcanizable rubber compound is sulfur-cured at a rubber temperature ranging from about 125° C. to 180° C. Preferably, the temperature ranges from about 135° C. to 160° C. The rubber compound is heated for a time sufficient to sulfur-vulcanize the rubber which may vary depending on the level of curatives and temperature selected. Generally speaking, the time may range from 3 to 60 minutes.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The above-described acrylate compounds may be added in a nonproductive stage or productive stage. Preferably, the acrylate compound is added in a productive stage.

The method of mixing the various components of the rubber containing the free acylate compound may be in a conventional manner. Examples of such methods include the use of Banburys, mills, extruders and the like. An important aspect is to intimately disperse the acrylate compound throughout the rubber and improve its effectiveness for subsequent reaction.

The sulfur-vulcanized rubber composition of this invention can be used for various purposes. For example, the rubber compounds may be in the form of a tire, hose, belt or shoe sole. Preferably, the rubber compound is used in various tire components. Such pneumatic tires can be built, shaped, molded and cured by various methods which are known and will be readily apparent to those having skill in such art. Preferably, the rubber composition is used as a wire coat, bead coat, ply coat and tread. As can be appreciated, the tire may be a passenger tire, aircraft tire, truck tire, earthmover, agricultural and the like.

The present invention may be better understood by reference to the following examples in which the parts or percentages are by weight unless otherwise indicated.

EXAMPLE 1

The rubber stock was prepared in a one-stage non-productive and one-stage productive Banbury mix procedure. Each rubber compound contained the same conventional amount of peptizer, process oil, zinc oxide, stearic acid, waxes, antioxidant, primary accelerator and secondary accelerator. The remaining ingredients are listed in Table I. All parts and percentages are by weight (parts by weight per 100 parts of rubber "phr") unless otherwise noted.

Cure properties were determined using a Monsanto oscillating disc rheometer which was operated at a temperature of 150° C. or 190° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTMD-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected.

Cure reversion measured using a rheometer can be defined as the incremental time required for a fixed decrease in torque from the maximum value, expressed here for example as Max Torq −1 dNm (time for the torque to decrease 1.0 unit below the maximum Torque). Such cure reversion measurements are defined by G. M. Bristow (NR Technology, 17 (1) 7, 1986).

Marching Modulus measured using a rheometer can be defined as the incremental time required for a fixed increase in torque from the maximum value, expressed here, for example, after 5.5 minutes.

The following Table II reports cure properties that were obtained for the rubber stocks that were prepared. These properties include minutes to 25 percent of the torque increase (t25), minutes to 90 percent of the torque increase (t90), marching modulus and reversion.

TABLE I

|  | Control Sample 1 | Sample 2 | Sample 3 | Sample 4 | Sample 5 | Control Sample 6 |
| --- | --- | --- | --- | --- | --- | --- |
| Non-Productive |  |  |  |  |  |  |
| E-SBR[1] | 96.25 | 96.25 | 96.25 | 96.25 | 96.25 | 96.25 |
| PBD[2] | 37.5 | 37.5 | 37.5 | 37.5 | 37.5 | 37.5 |
| Carbon Black | 70 | 70 | 70 | 70 | 70 | 70 |
| PETA[3] | 0 | 1 | 4 | 0 | 0 | 0 |
| Productive |  |  |  |  |  |  |
| Sulfur | 1.45 | 1.45 | 1.45 | 1.45 | 1.45 | 1.45 |
| PETA[3] | 0 | 0 | 0 | 1 | 4 | 0 |

[1]Oil extended emulsion polymerized styrene butadiene rubber commercially available from The Goodyear Tire & Rubber Company as PLF 1712C (70 parts by weight rubber and 26.25 parts by weight oil)
[2]Oil extended solution polymerized polybutadiene rubber commercially available from The Goodyear Tire & Rubber Company as Bud 1254 (30 parts by weight rubber and 7.5 parts oil)
[3]Pentaerythritol tetraacrylate

TABLE II

| | Control Sample 1 | Sample 2 | Sample 3 | Sample 4 | Sample 5 | Control Sample 6 |
|---|---|---|---|---|---|---|
| Rheometer @ 150° C. | | | | | | |
| Min Torque (dNm) | 8.8 | 8.5 | 8.5 | 8.5 | 8.5 | 9.0 |
| Max Torque (dNm) | 28 | 28 | 28 | 27.8 | 26.5 | 28.5 |
| Δ Torque, (dNm) | 19.2 | 19.5 | 19.5 | 19.3 | 18 | 17.5 |
| t25 (min) | 9.25 | 9.75 | 9.75 | 9.75 | 10 | 9.5 |
| t90 (min) | 18 | 20 | 20 | 20 | 21 | 18.5 |
| Rheometer @ 190° C. | | | | | | |
| Min Torque (dNm) | 10.3 | 9.9 | 9.5 | NA | NA | NA |
| Max Torque (dNm) | 26.1 | 25.4 | 25.4 | NA | NA | NA |
| Δ Torque (dNm) | 15.8 | 15.5 | 15.9 | NA | NA | NA |
| Modulus (MPa) | | | | | | |
| 100% | 1.18 | 1.13 | 1.08 | 1.11 | 1.01 | 1.21 |
| 200% | 2.18 | 2.03 | 1.85 | 1.96 | 1.68 | 2.25 |
| 300% | 4.06 | 3.69 | 3.31 | 3.53 | 2.93 | 4.14 |
| Tensile | | | | | | |
| Breakstrength (MPa) | 16.71 | 16.52 | 15.48 | 16.72 | 15.37 | 16.82 |
| Elongation @ Break (%) | 792 | 831 | 837 | 861 | 894 | 797 |
| Hardness | | | | | | |
| Room Temp | 57.8 | 58.3 | 57.9 | 57.4 | 55.5 | 58.3 |
| 100° C. | 44.7 | 43.3 | 42.7 | 42.7 | 40.2 | 44.5 |
| Rebound (%) | | | | | | |
| Room Temp | 31.2 | 30.6 | 29.6 | 30.9 | 30.5 | 31.4 |
| 100° C. | 46.3 | 45.3 | 44.6 | 45.7 | 45.0 | 47.3 |
| Din Abrasion | 87 | 88 | 95 | 92 | 99 | 84 |
| RPA 11 hz, 100° C. | | | | | | |
| G' 1% | 1977 | 2015 | 2080 | 1977 | 1961 | 1993 |
| G' 5% | 1191 | 1188 | 1219 | 1173 | 1141 | 1205 |
| G' 10% | 962 | 945 | 965 | 933 | 909 | 968 |
| Autovibron tan delta | | | | | | |
| −30° C. | .206 | .207 | .184 | .232 | .210 | .195 |
| −20° C. | .155 | .157 | .147 | .176 | .164 | .134 |
| −10° C. | .138 | .141 | .137 | .161 | .151 | .119 |
| 0° C. | .138 | .141 | .137 | .157 | .151 | .124 |
| 60° C. | .131 | .142 | .143 | .140 | .146 | .133 |
| Rheometer @ 150° C. Marching Modulus (time to rise designated points after 20 min) | | | | | | |
| Max Torque + .5 dNm (min) | — | — | 15 | — | 15 | — |
| Rheometer @ 190° C. Marching Modulus (time to rise designated points after 5.5 min, maximum torque of compound) | | | | | | |
| Max Torq + .5 dNm (min) | — | 39.5 | 2.8 | NA | NA | NA |
| Max Torq + 1.5 dNm (min) | — | — | 8.5 | NA | NA | NA |
| Max Torq + 2.5 dNm (min) | — | — | 14.8 | NA | NA | NA |
| Reversion (time to decrease designated points below maximum torque of compound) | | | | | | |
| Max Torque − .5 dNm (min) | 2.5 | — | — | NA | NA | NA |
| Max Torque − 1 dNm (min) | 5 | — | — | NA | NA | NA |

The rheometer data at 150° C. shows no reversion for the control Samples 1 and 6 or the Samples 2–5 containing pentaerythritol tetraacrylate (PETA). Samples 3 and 5 containing 4 phr of the PETA had marching modulus values. The order of addition, nonproductive (Sample 3) versus productive (Sample 5) did not appear to affect the rheometer curve. The rheometer data at 190° C. shows reversion, 1 dNm drop after 5 minutes, for the control Sample 1 and no reversion for Samples 2 and 3 containing PETA. Sample 2 containing 1 phr of PETA was very stable with only a 0.5 dNm rise after 40 (39.5) minutes. Sample 3 containing 4 phr of PETA had a marching modulus with a 2.5 dNm rise after 14.8 min.

Tire handling which is related to the dynamic values (G') should be unaffected by the present invention. The tan delta values from −30° C. to 0° C. indicate equal to better wet traction for Samples 2–5. Higher tan delta values suggest better wet traction.

What is claimed is:

1. A sulfur-vulcanizable rubber compound comprising
   (a) 100 parts by weight of an uncrosslinked rubber selected from the group consisting of natural rubber, synthetic cis-1,4-polyisoprene, polybutadiene, copolymers of isoprene and butadiene, copolymers of acrylonitrile and butadiene, copolymers of acrylonitrile and isoprene, terpolymers of styrene, butadiene and isoprene, copolymers of styrene and butadiene and blends thereof;
   (b) from 0.25 to 10 phr of a free acrylate compound which is intimately dispersed throughout said rubber and said acrylate being selected from the group consisting of trimethyl propane triacrylate, trimethyl propane trimethacrylate, glycerol triacrylate, glycerol trimethacrylate, trimethyl ethane triacrylate, trimethyl ethane triacrylate, pentaerythritol tetraacrylate, pentaerythritol tetramethacrylate, dipentaerythritol pentaacrylate and mixtures thereof;
   (c) from 0.5 to 6 phr of a sulfur-vulcanizing agent selected from the group consisting of elemental sulfur, an amine disulfide, polymeric polysulfide, sulfur olefin adducts and mixtures thereof;
   wherein said rubber compound is free from any peroxide curative.

2. The sulfur-vulcanizable rubber compound of claim 1 wherein said rubber is selected from the group consisting of natural rubber, synthetic cis-1,4-polyisoprene, polybutadiene, copolymers of isoprene and butadiene, terpolymers of styrene, butadiene and isoprene, copolymers of styrene and butadiene and blends thereof.

3. The sulfur-vulcanizable rubber compound of claim 1 wherein said acrylate is pentaerythritol tetraacrylate.

4. The sulfur-vulcanizable rubber compound of claim 1 wherein from 1 to 5 phr of a free acrylate compound is intimately dispersed throughout said rubber.

5. A sulfur-vulcanized rubber compound having improved reversion resistance comprising the compound of claim 1 after said compound has been heated to a rubber temperature ranging from about 125° C. to 180° C.

6. The sulfur-vulcanized rubber compound of claim 5 wherein said rubber is selected from the group consisting of natural rubber, synthetic cis-1,4-polyisoprene, polybutadiene, copolymers of isoprene and butadiene, terpolymers of styrene, butadiene and isoprene, copolymers of styrene and butadiene and blends thereof.

7. The sulfur-vulcanized rubber compound of claim 5 wherein said acrylate is pentaerythritol tetraacrylate.

8. The sulfur-vulcanized rubber compound of claim 5 wherein said rubber compound is heated for a period of time ranging from about 3 to 60 minutes.

9. The sulfur-vulcanized rubber compound of claim 5 in the form of a tire, hose, belt or shoe sole.

10. The sulfur-vulcanized rubber compound of claim 9 wherein said rubber compound is in the form of a tire.

11. The sulfur-vulcanized rubber compound of claim 10 wherein said rubber compound is used in a component of said tire selected from the group consisting of wire coat, bead coat, ply coat and tread.

12. The sulfur-vulcanized rubber compound of claim 10 wherein said tire is selected from the group consisting of a passenger tire, aircraft tire, truck tire, earthmover and agricultural tire.

* * * * *